United States Patent [19]  [11] 3,995,230
See  [45] Nov. 30, 1976

[54] LASER
[75] Inventor: Brian A. See, Highbury, Australia
[73] Assignee: The Commonwealth of Australia, Canberra, Australia
[22] Filed: Apr. 7, 1975
[21] Appl. No.: 565,612

[30] Foreign Application Priority Data
Apr. 8, 1974 Australia............................. 7182/74

[52] U.S. Cl..................... 331/94.5 C; 331/94.5 Q
[51] Int. Cl.² ............................................. H01S 3/08
[58] Field of Search .................................. 331/94.5

[56] References Cited
UNITED STATES PATENTS
3,315,177  4/1967  Benson .......................... 331/94.5 Q
3,725,815  4/1973  Cassedy, Jr. et al. ........... 331/94.5 Q
3,766,466  10/1973  Faries et al. ....................... 331/94.5

Primary Examiner—William L. Sikes
Attorney, Agent, or Firm—Haseltine, Lake & Waters

[57] ABSTRACT

An improved laser system having a Q-switch which is a roof prism rotatable about a spinning axis transverse to the axis of the laser rod, in which the medial plane of the prism is offset from the axis of the rod to receive output radiation from the rod on one side of its medial plane and direct the radiation from the other side of its medial plane to a reflector which radiation is back reflected to the rod by prism, the laser rod being outside of the path of the radiation between the reflector mirror and the prism.

5 Claims, 2 Drawing Figures

3,995,230

LASER

This invention relates to an improved laser system and while not limited to range finding, one of its important uses is in this respect.

BACKGROUND OF THE INVENTION

The general background of the invention is that a laser rod is pumped by any energy source, the rod being provided with end mirrors one of which is a total reflector and the other is a partial or semi-transparent reflector, switching means being provided for short-pulse lasers such as in range finding, these being in the nature of a shutter and being interposed between one of the mirrors and the amplifying rod of the laser, the general principle being that the rod is excited beyond the degree ordinarily needed for laser action, but the shutter prevents such action. When the shutter is abruptly opened, the stored energy is released in a large pulse of short duration.

One of the methods which has been used heretofore to give this shutter action has been to use a spinning prism having its axis of rotation at right angles to the axis of the rod but having its optical axis coaxial with the rod, so that when this prism is spun, there is only one short period during the rotation of the prism when the prism acts as a back reflecting mirror, thus causing the prism to act as a shutter to allow the laser to be pumped prior to the commencement of lasing.

In the simple type of Q-switching the ray passes twice through the rod because the prism is coaxial with the rod, and it has been found in practice that this causes a loss of efficiency due to the second amplification effect, and to try and avoid this an earlier system utilizes a single rotating switching mirror between the ends of the laser rod and the totally reflective mirror but such a mirror then must be placed remotely of the axis of the laser rod with consequent increase in dimension of the unit and problems in mounting and correct orientation of both the reflective mirror and the rotating mirror.

Another system also envisaged was to have a remote mirror placed with its face parallel to the partially reflective mirror but outside of the plane of the laser rod itself and to then use a pair of oppositely rotating mirrors, one in the plane of the laser rod and the other positioned to direct the ray from the first mirror to the totally reflective mirror. Here while some space may be saved, again certain problems exist in mounting and maintaining alignment although an increase in efficiency can be expected.

SUMMARY OF THE INVENTION

The present invention overcomes the difficulties experienced with the previous systems referred to and comprises the use of a roof prism with its spinning axis at right angles to the axis of the laser but with its medial reflective plane offset from the axis of the laser rod, and the preferable use of a single mirror system in which part of the mirror which is on one side of the medial plane of the prism is part reflective while that partially on the mirror on the other side of the medial plane of the prism is totally reflective.

The arrangement thus is one in which the radiation from the laser rod is reflected by one face of the roof prism on to another face at 90° to the first face and is reflected by this face to the total reflector of the mirror and back again to the laser rod.

The principal advantage of this system is that a relatively compact unit results in which the reflected radiation path is parallel to but outside of the laser rod, a further advantage being that by use of a prism with its reflecting faces arranged at 90°, and having its medial plane offset from the laser rod, the rotational axis of the spinning prism is not critical because a characteristic of such a prism is to give parallel reflection even if the spinning axis is inaccurate.

The device thus comprises a laser rod which is supplied with pumping radiation according to any preferred system and this rod has at one end a mirror in which the part on the axis of the laser rod is part reflecting but a remote part is totally reflecting while at the other end of the laser rod is the Q-switch in the form of a spinning prism which has its medial plane offset from the axis of the laser and thus directs the reflected radiation in a path parallel to the laser rod axis, the only really critical component then being the mirror which as said can be formed on one member with different reflective characteristics, and provided this is carefully aligned with the laser rod, is the only critical adjustment.

The roof prism because of its characteristic parallel reflection mode, can thus be mounted on the shaft of a motor or the like, and if the bearings of the motor wear or other misalignment occurs the operation of the laser device is not affected.

BRIEF DESCRIPTION OF THE DRAWINGS

In order however that the invention will be fully understood, an embodiment thereof will now be described with reference to the accompanying drawings in which.

DESCRIPTION OF THE PREFERRED EMBODIMENTS

Figure 1:
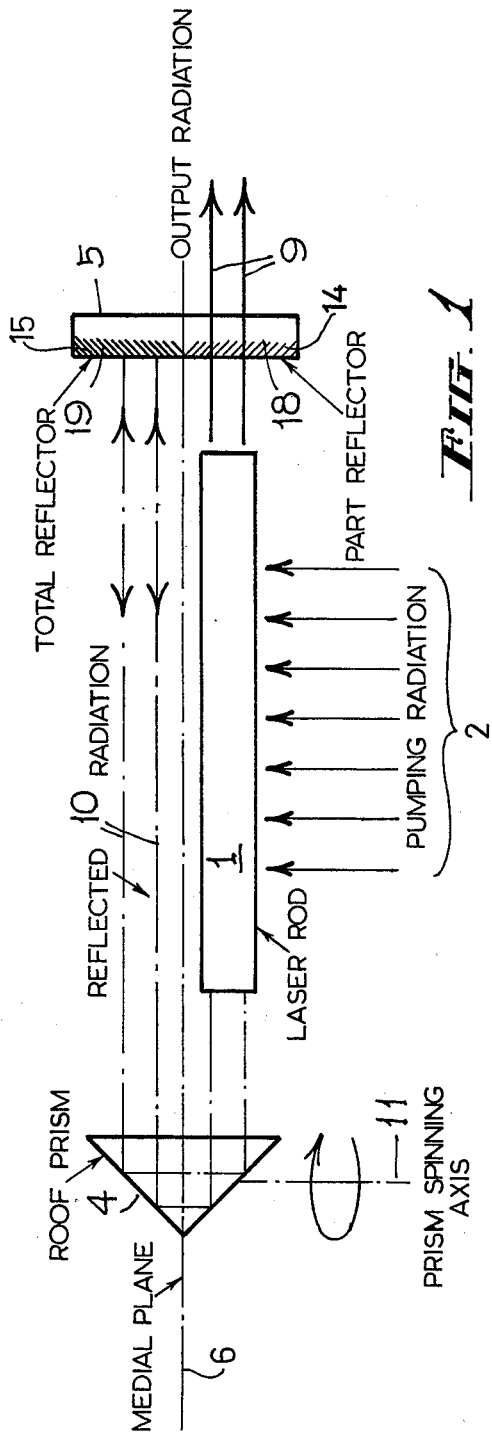
FIG. 1 is a schematic illustration showing how the components of the system can be arranged.

The laser rod 1 is positioned adjacent to the radiation source 2 in a supporting frame 3, which frame 3 supports at one end the roof prism 4 and at the other end the compound reflector 5 which is shown formed on the same support.

Figure 2:
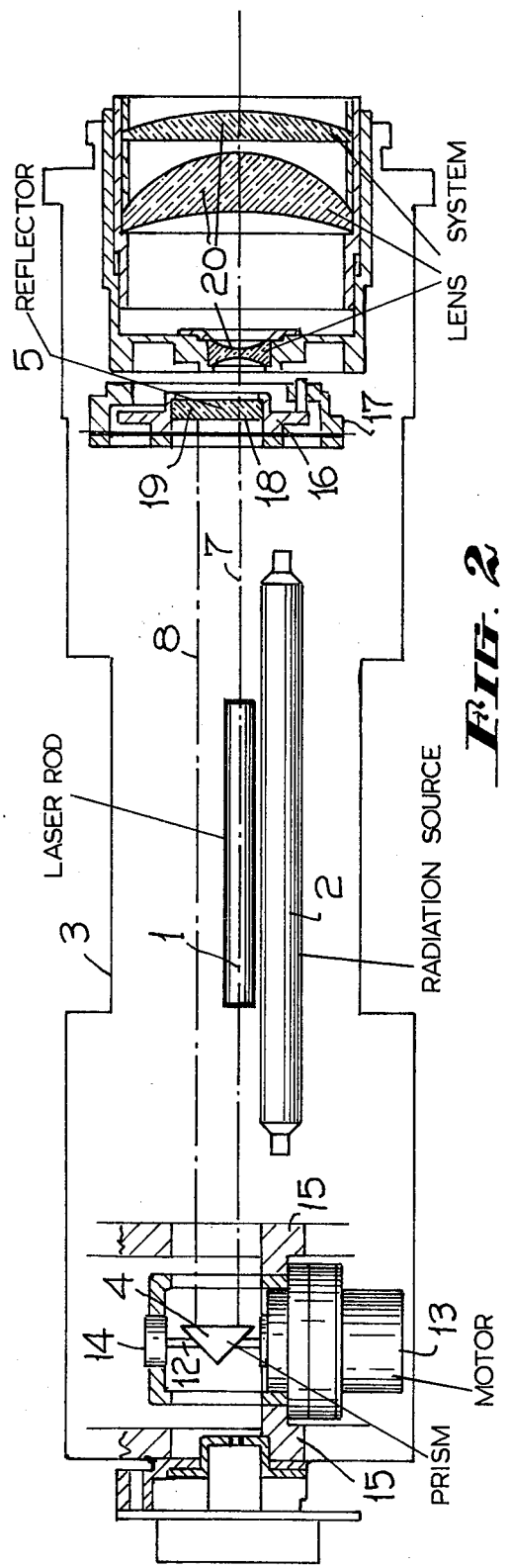
FIG. 2 is a fragmentary sectional elevation of a unit according to the invention, showing the supporting frame for the components as a schematic outline only, as used for instance in range finding.

The medial plane of the roof prism 4 and the reflector 5 is designated 6 in FIG. 1, while in FIG. 2 the line 7 designates the axis of the radiation through the laser rod 1 and the line 8 shows the axis of the reflected radiation which as will be seen is parallel to the line 7 but is offset by the roof prism 4 to be outside of the laser rod 1.

In FIG. 1 the lines 9 represent the output radiation and the lines 10 the reflected radiation, while 11 is the spinning axis.

The roof prism 4 is carried on a shaft 12 of a motor 13, the outer end of the shaft being steadied by a bearing 14. The motor 13 is supported by members 15 forming part of the frame 3.

The reflector 5 is supported in a mount 16 carried by a support 17 connected with the frame 3, and has a section 18 which is a partial or semi-transparent reflector and a section 19 which is a total reflector.

The laser rod 1 and the radiation source 2 can be of any type as known in the art and can be mounted in the frame 3 in any manner.

In the embodiment shown in FIG. 2 a lens system 20 is shown in axial alignment with the laser rod 1.

From the foregoing it will be appreciated that a simple and effective device is provided which utilizes a Q-switching prism offset from the axis of the laser to allow a single mirror unit to be used at the opposite end of the laser rod, giving a relatively long reflected path for the ray which has material advantages but keeping the reflected path parallel to the laser rod so that space considerations are minimized and simplicity of construction results, but obviously although the preferred form has been described above, it will be realized that the system can be used with a pair of reflective mirrors separately mounted and that modifications of this nature will be within the spirit of the invention. Obviously the mirror surfaces can be in the nature of spots on a single member and in accordance with laser practice these need not necessarily be plane mirrors but could be shaped mirrors and there could be a variation between the construction of the output mirror and the totally reflective mirror.

Advantages of the invention are that
a. it can double the available output energy from a particular rod and cavity length, and may allow the use of smaller rods with reduction in cost and size of components, and
b. it involves no additional elements beyond those normally required.

I claim:

1. An improved laser system comprising a laser rod, first and second reflector mirrors associated with said rod, one said mirror being a total reflector and the other said mirror being a partial reflector, a pumping radiation source for the said rod, and a Q-switch including a roof prism rotatable about a spinning axis transverse to the axis of the said laser rod, the medial plane of the said prism being offset from the axis of the said rod by an amount to receive output radiation from the said rod on one side of its medial plane and direct the said radiation from the other side of its medial plane to said one reflector mirror, whereby the said radiation is back reflected to the said rod by said prism, the said laser rod being outside of the path of the radiation between said one reflector mirror and the said prism.

2. An improved laser system according to claim 1 wherein the prism is a 90° prism to direct radiation to the said one reflector mirror in a path parallel to the axis of the said laser rod.

3. An improved laser system according to claim 2 wherein the said partial reflector and the said total reflector, are adjacent each other.

4. An improved laser system according to claim 2 wherein the said part reflector and the said total reflector are formed as a single mirror unit.

5. In laser apparatus comprising a laser rod and pumping radiation means for the rod, a Q-switch comprising a roof prism rotatable about a spinning axis transverse to the axis of the laser rod and having its medial plane offset from the axis of the said rod and located to direct radiation emitted from the said rod at its rear back past the said rod to a total reflector situated adjacent a partial reflector adjacent the front of the said rod.

* * * * *